Patented Aug. 14, 1945

2,382,448

UNITED STATES PATENT OFFICE 2,382,448

LIGHT-WEIGHT NONMETALLIC COMPOSITION CONTAINING PALMETTO PITH

Charles Schuh, Brooklyn, N. Y., assignor to Carbide and Carbon Chemicals Corporation, a corporation of New York No Drawing. Application September 11, 1942, Serial No. 457,958

11 Claims. (Cl. 106—216)

This invention relates to composition products and to methods of producing the same, and more particularly to bonded composition products having increased strength and abrasive resistance, and to methods of producing the same.

In Patent No. 2,156,309, issued on May 2, 1939, in the name of Charles Schuh, there is described a method of producing compressed products in which a fine powdered material and a combined filter aid and medium of extension are mixed in a dilute solution or aqueous dispersion containing a binding agent, such as, for example, a ¼% latex or a ½% aqueous resinous dispersion. The combined filter aid and medium of extension preferably comprises finely pulped fibrous material, such as finely pulped newspaper or wood pulp in which the average individual fiber is less than approximately 0.08 of an inch in length. The powdered material preferably comprises regranulated cork or the powdered exterior surface of cork bark.

These several components are intimately mixed together, using about 15% to about 25% of the medium of extension together with about 75% to about 85% of the powdered material, and the mixture is run into molds and agitated while still very dilute for the purpose of dewatering the same. After a major portion of the liquid has filtered off, pressure is applied to form a matrix and the resultant slab or formed product is then removed from the form and placed in a dryer. The filtrate may be recovered and used for subsequent batches of material.

The product produced by this method may have a density of approximately 7 to 9 pounds per cubic foot and a low thermal conductivity, preferably ranging from approximately 0.24 to about 0.35.

While the product produced is satisfactory in many respects, for certain uses increased strength, better bonding, and better abrasive resistance are required. Additionally, under certain circumstances, the cork is not only difficult to obtain but also is relatively expensive.

It is therefore among the objects of this invention to produce a composition product comprising granular material including palmetto pith; to provide a method of treating palmetto pith so that the resultant product is substantially water-repellent; to produce a composition product characterized by high strength and thorough bonding, and which has a high abrasive resistance; to provide a method of producing economically a composition product having desirable characteristics of strength and abrasive resistance; and to provide a composition product which is strong, well bonded, and has a high abrasive resistance.

These and other objects of the invention will in part be obvious and in part become apparent from the following description.

Generally speaking, the invention comprises treating palmetto pith, previously shredded from the scrub palmetto root, with water to extract the water-soluble material therefrom, filtering off the water extract, mixing the extracted pith with an aqueous fiber suspension, and forming a dilute suspension containing more than 90% by weight of water to which is added from 2% to 6% by weight of a binding agent in the form of an unstabilized emulsion not requiring a precipitant, such as described in U. S. Patent No. 2,156,309. The composite suspension is dewatered in a suitable mold and the resultant matrix may be compressed to form a light-weight water-repellent composition when finally dry.

In carrying out the invention, palmetto pith, which is a dark brown granular material, microscopically of a spongy nature, obtained from the scrub palmetto root by debarking the root and then shredding out the pith from between the fibers of the root, is treated with water for about a half hour to extract water-soluble material therefrom, and the water extract is then filtered off. It has been found that, if the palmetto pith is used without any special treatment, any resultant product obtained therefrom is not water repellent. As the composition which is an object of the present invention is intended primarily as a thermal insulation material, it must therefore have the lowest possible density, be water repellent and have the lowest possible rate of moisture absorption. Consequently, it is essential that the palmetto pith be treated so as to make the resultant composition in which it is used water repellent. Therefore, the treatment of the pith with water for substantially a half hour to extract water-soluble material therefrom is of the greatest importance as otherwise the pith would be unsuitable for the desired uses.

If the palmetto pith has been extracted from the root some time previously and has air dried, the pith is treated with boiling water for substantially half an hour to remove water-soluble constituents therefrom. If the pith has been freshly extracted, it is treated with cold water, as treatment of the fresh pith with hot water solubilizes (makes soluble) the starch and makes the solution unfilterable. In any event, the water treatment, which may be referred to as washing, soaking, or immersion, is carried out until the solution becomes difficult to filter due to solubilized starch.

The treated pith is then mixed with a previously prepared aqueous fiber suspension. This suspension preferably comprises individualized fiber of an average length less than 0.08 inch mixed with water to form a dilute suspension containing at least 90% by weight of water. The individualized fiber may be prepared by suitably shredding or finely pulping fibrous material, such as newspaper stock, wood pulp, or asbestos pulp stock. When the treated palmetto pith is added to the aqueous dilute suspension, the resultant suspension should contain at least 90% by weight of water. The pith may comprise about 50% to 90% by weight and the extension medium about 10% to 50% by weight of the total dry weight of the mixture. If desired, other powdered material, such as regranulated cork or wood flour, may be mixed in certain proportions with the palmetto pith in order to obtain certain characteristics. Generally speaking, however, the palmetto pith is preferably used by itself as the powdered material.

About 2% to 6% by weight paraffin in the form of an unstabilized emulsion not requiring a precipitant, such as described in U. S. Patent No. 2,156,309, is then added to the dilute aqueous suspension and the suspension is thoroughly mixed.

Subsequent to this mixing operation, the composite suspension is poured into a suitable mold and dewatered by permitting the filtrate to drain therefrom without disturbing the formation of a matrix. During the dewatering operation, the composite suspension may be subjected to pressure depending on how dense a product it is desired to obtain. However, the dewatering may be carried out without any appreciable application of pressure to obtain material of the lowest density. Suction may be used in dewatering, if desired.

After the filtrate has been drained from the composite suspension, it may be reused in subsequent operations. The resulting matrix is then placed in a suitable oven or other heating means and thoroughly dried. After being thoroughly dried, the composition product is removed from the dryer and is ready for use.

The following example will serve to illustrate the invention more clearly. Water-extracted palmetto pith, finely pulped news stock and paraffin in the form of an unstabilized emulsion to be used without a precipitant, according to U. S. Patent No. 2,156,309, are mixed together to form the product. The palmetto pith may be in the proportion of about 58% by weight, the finely pulped news stock, or extension medium, in the proportion of about 36% by weight, and the paraffin in the proportion of about 6% by weight. The pith is treated with water for substantially half an hour or for a sufficient time to remove water-soluble materials therefrom, and the extension medium is shredded until the average length of the individual fiber is less than about 0.08 inch. The composition is uniformly dispersed in dilute aqueous suspension such that the mixture is about 90% by weight water, and then dewatered and dried. The dewatering may be carried out without any appreciable application of pressure, for lowest density. Suction, however, may be used to aid in dewatering. Under these conditions, the resulting product will have a density of about 8 pounds per cubic foot, a moisture absorption as low as 4% (by volume) in 24 hours when totally immersed, and a transverse strength as high as 80 pounds per square inch. Additionally, the product will be substantially water repellent, strong, and well bonded, and will have a high abrasive resistance.

If a pressure of about 20 pounds per square inch is applied during filtering, the resulting product will have a density of 8 to 11 pounds per cubic foot. Pressures up to 100 pounds per square inch may be used and still result in a lightweight product.

The advantages of using the water-extracted palmetto pith over granulated cork, for example, to form the composition product are the obtaining of increased strength and better bonding, which means also better abrasive resistance when compared to other granular material, such as similar compositions made with cork or wood flour. Additionally, the palmetto pith is relatively economical to use, compared to the cork and the wood flour. This is more particularly true as it is sometimes rather difficult to obtain the cork and the material may likewise be very expensive.

The spongy nature of the palmetto pith enables it to interlock better with the fibrous extension medium, obtaining a transverse strength of 80 to 200 pounds per square inch, with an average between said values and well over 50 pounds per square inch depending upon the processing pressures used, as compared to 20 to 80 pounds per square inch, with an average well below 50 pounds per square inch with such materials as wood flour and cork, for instance.

It is within the contemplation of the invention that the percentage of palmetto pith used in the composition may be varied over a reasonably wide range, and other granular materials may be substituted in part without affecting the basic qualities of low density and water repellency in the finished product. Appropriate binders, in the form of resin emulsions, may be added with modifications in the strength of the resultant finished product.

While a specific example of the application of the principle of the invention has been given, it will be understood by those skilled in the art that the invention may be otherwise embodied.

What is claimed is:

1. A light-weight non-metallic product comprising, by weight, 50% to 90% palmetto pith, 10% to 50% fibrous material, and 2% to 6% binding agent.

2. A light-weight non-metallic product comprising, by weight, about 58% palmetto pith, about 36% fibrous material, and less than 6% paraffin.

3. A light-weight non-metallic product comprising, by weight, a major percentage of palmetto pith substantially free from water-soluble substances, a minor percentage of fibrous material, and paraffin; said product being characterized by low density, water-repellency, and good bonding.

4. A light-weight non-metallic product comprising, by weight, 50% to 90% palmetto pith substantially free from natural root fibers, 10% to 50% fibrous material, and 2% to 6% binding agent.

5. A light-weight non-metallic product comprising, by weight, 50% to 90% palmetto pith substantially free from water-soluble substances, 10% to 50% fibrous material, and 2% to 6% binding agent.

6. A light-weight non-metallic product comprising, by weight, about 58% palmetto pith substantially free from natural root fibers, about 36% fibrous material, and less than 6% paraffin.

7. A light-weight non-metallic product comprising, by weight, about 58% palmetto pith substantially free from water-soluble substances, about 36% fibrous material, and less than 6% paraffin.

8. A light-weight non-metallic product comprising, by weight, a major percentage of palmetto pith substantially free from natural root fibers, a minor percentage of fibrous material, and paraffin; said product being characterized by low density and good bonding.

9. A light-weight non-metallic product comprising, by weight, a major percentage of palmetto pith substantially free from water-soluble substances, a minor percentage of fibrous material, and a water-insoluble binder; said product being characterized by low density, water repellency, and good bonding.

10. A light-weight non-metallic product comprising, by weight, a major percentage of palmetto pith, a smaller percentage of fibrous material and a still smaller percentage of a binding agent.

11. A light-weight non-metallic product comprising, by weight, a major percentage of palmetto pith substantially free from water-soluble substances, a smaller percentage of fibrous material and a still smaller percentage of a water-insoluble binding agent; said product being characterized by low density, water repellency, and good bonding.

CHARLES SCHUH.